United States Patent [19]
Stanley

[11] Patent Number: 5,961,061
[45] Date of Patent: Oct. 5, 1999

[54] STRAP ROLLING DEVICE

[76] Inventor: Wayne Stanley, 224 Shamrock Way, Pismo Beach, Calif. 93449

[21] Appl. No.: 09/096,594

[22] Filed: Jun. 12, 1998

[51] Int. Cl.$^6$ ..................................................... B65H 75/30
[52] U.S. Cl. ................... 242/395; 242/404.2; 242/532.6; 242/546.1; 410/100; 24/545
[58] Field of Search ................................. 242/404.2, 403, 242/546.1, 532.6, 395; 410/100, 97; 24/67.9, 545, 563

[56] References Cited

U.S. PATENT DOCUMENTS

| | | |
|---|---|---|
| D. 138,523 | 8/1944 | Sand . |
| D. 307,239 | 4/1990 | Topping . |
| 1,621,008 | 3/1927 | Fricker . |
| 1,675,286 | 6/1928 | Van Valkenburg . |
| 2,166,344 | 7/1939 | Donohue . |
| 2,469,443 | 5/1949 | Reiter . |
| 2,629,197 | 2/1953 | Duvall . |
| 2,933,262 | 4/1960 | Fish . |
| 3,946,964 | 3/1976 | Zinser . |
| 4,266,740 | 5/1981 | Ramos et al. . |
| 4,311,288 | 1/1982 | Galland . |
| 4,390,141 | 6/1983 | Webster . |
| 4,892,265 | 1/1990 | Cox . |
| 5,033,690 | 7/1991 | McIver . |

*Primary Examiner*—Donald P. Walsh
*Assistant Examiner*—William A. Riveria
*Attorney, Agent, or Firm*—Coudert Brothers

[57] ABSTRACT

A strap rolling device (10) having a roller (12) which has a roller crank (12A) and a roller head (12B) each positioned at opposite ends thereof. The roller head (12B) has a roller head base (12BA) securely connected to the roller crank (12A). The roller head (12B) further has a roller head strap connector (12BC) securely connected to and extending outwardly at an approximate perpendicular angle from the roller head base (12BA). The roller head (12B) further has a roller head strap grip (12BB) securely connected to and extending from the roller head strap connector (12BC) at an approximate perpendicular angle in an approximate parallel configuration to the roller head base (12BA) forming a roller head slot (12BD) therebetween which functions to accept at least an end of the strap therein. The strap rolling device (10) having a connector (14) which has a connector shaft (14A) having a connector shaft eyelet (14AA) positioned at one distal end functioning to rotatably accept the roller crank (12A) therein. The connector shaft (14A) further has a C-type clamp holding member positioned at an opposite distal end of the connector shaft (14A) which functions to engage a truck rub rail. In another embodiment of the invention, clips (16) are provided for maintaining a cargo strap from unrolling after it is wound around the roller head (12B).

6 Claims, 4 Drawing Sheets

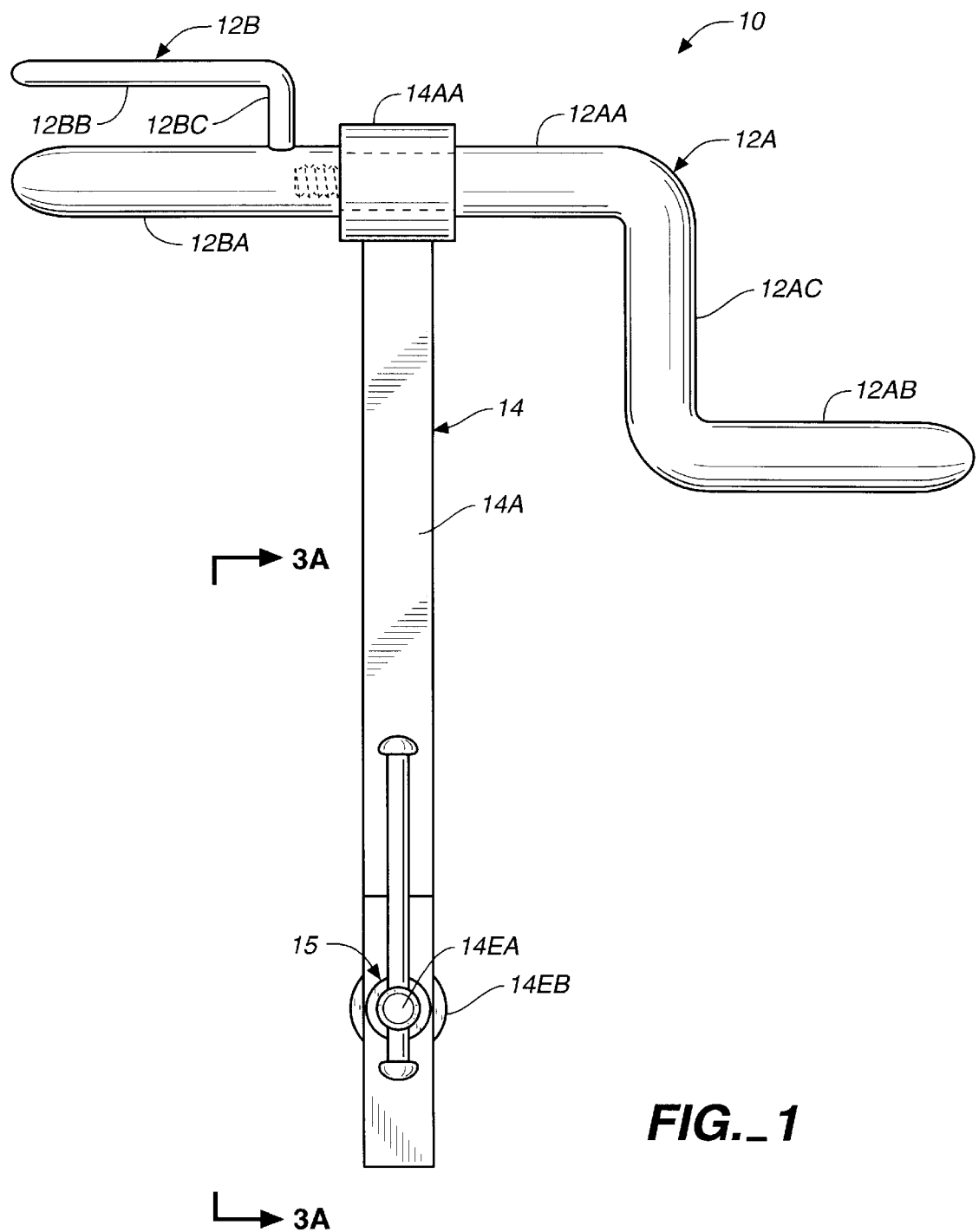
FIG._1

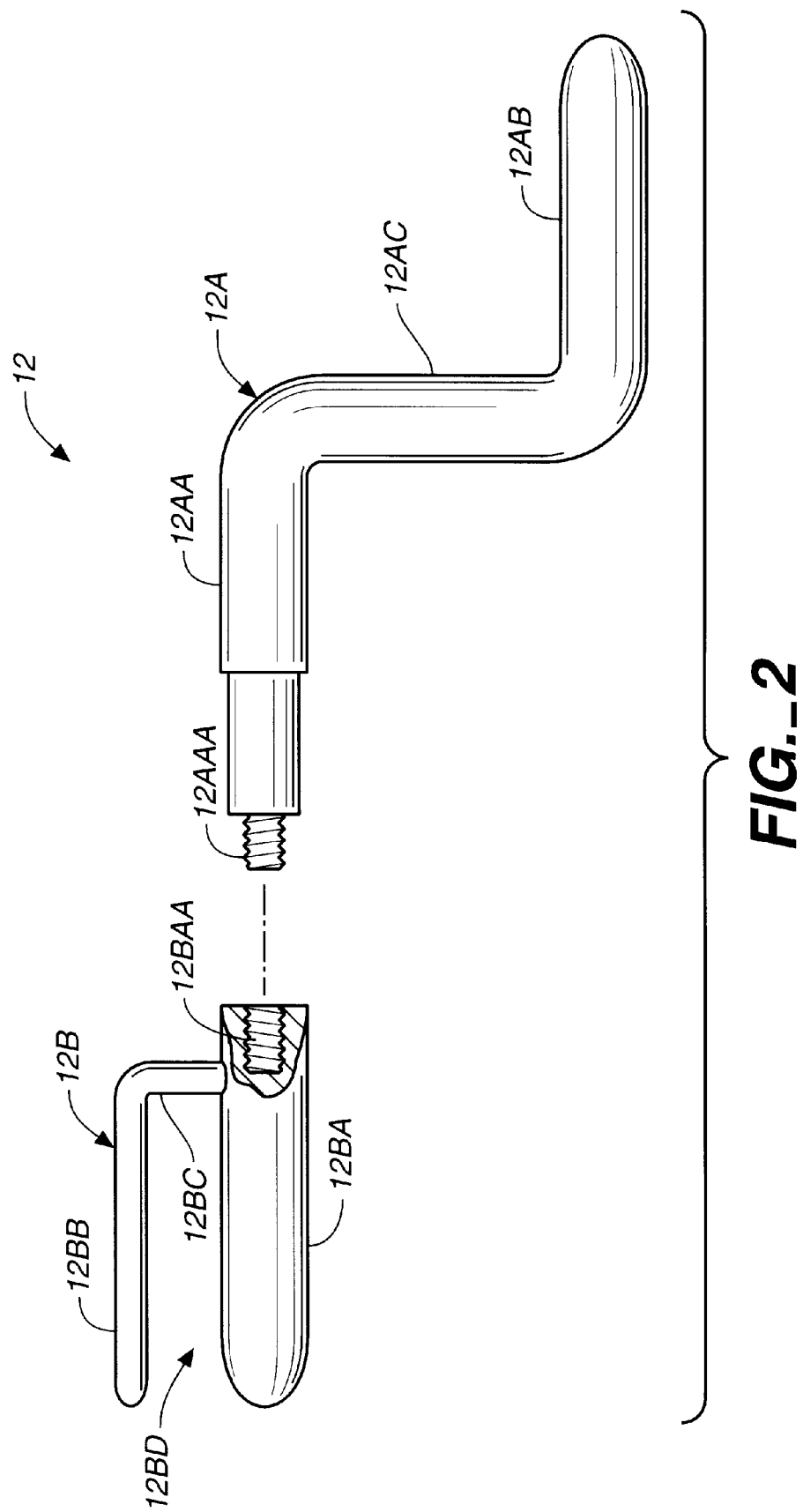

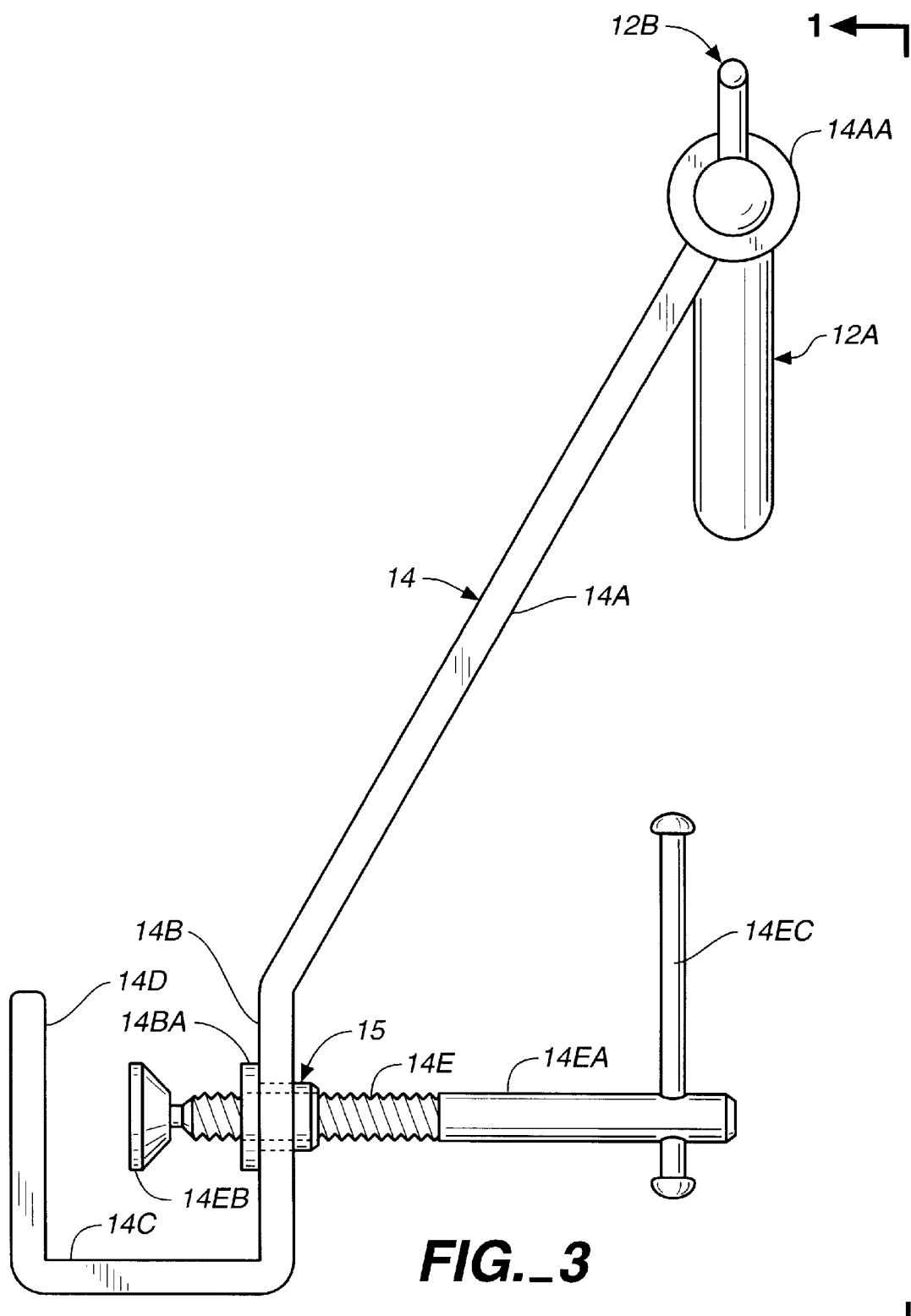
FIG._3

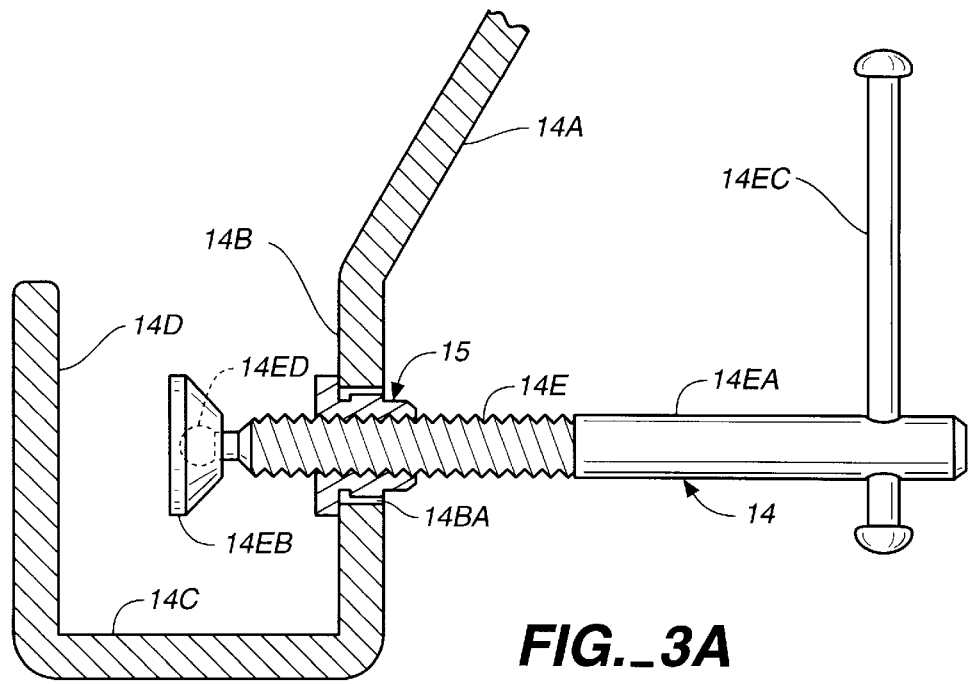
FIG._3A
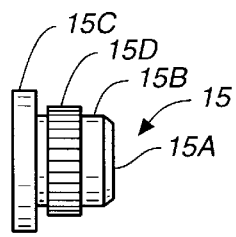
FIG._3B
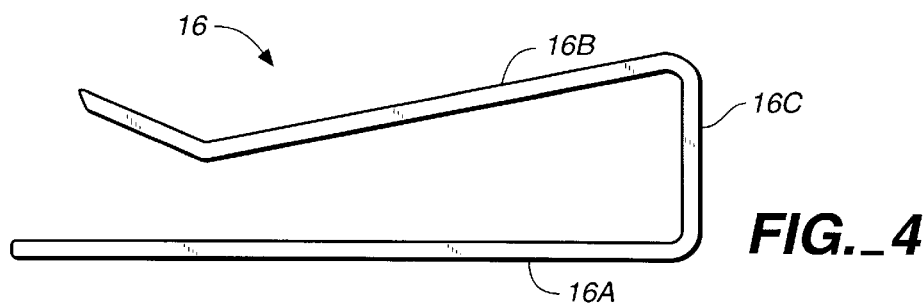
FIG._4
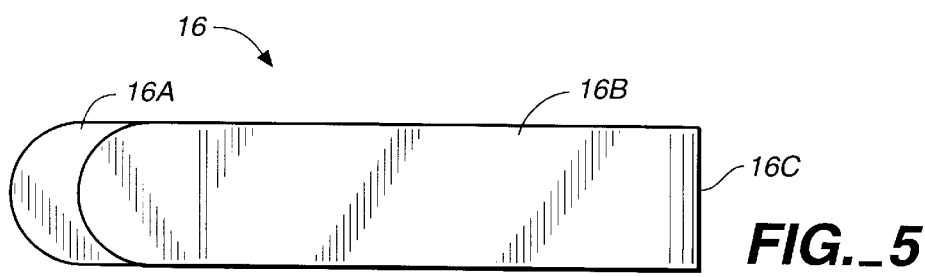
FIG._5

STRAP ROLLING DEVICE

BACKGROUND OF THE INVENTION

1. Field of the Invention

The present invention relates to strap rollers. More particularly, the present invention relates to strap rollers having a crank and a specifically designed holding means to attach to a truck rub rail or stake pocket.

2. Description of the Prior Art

Strap rollers are well known in the art. They range in configurations from crank handles built into strap rollers to simple spool crank configurations. However, there are no strap rollers which employs a crank and a holding means to efficiently mount the strap roller to a truck rub rail or stake pocket.

One strap rolling device that is available comprises a strap roller having a disk with a central threaded hole to receive a male member projecting from a threaded free end of a roller crank shaft and extending at a perpendicular angle from the roller crank shaft and with four concentric threaded holes to receive four projecting rods. These rods are in parallel with the roller crank shaft and serve as strap grips around which the strap is wound. This prior art crank is substantially the same as roller crank 12A shown in FIG. 2 and has roller crank handle 12 AB, roller crank connector 12AC and roller crank shaft 12AA having roller crank shaft male member 12AAA. A connector shaft eyelet is welded to one end of a flat connector shaft to receive the free end of the roller crank shaft prior to its threaded engagement with the disk of the strap roller. An L-shaped metal bracket is welded to the other end of the connector shaft to engage the truck rub rail. An insert having an ordinary machine threaded hole there through is removably placed into a hole drilled into the flat surface of the shaft adjacent to the other end of the shaft and an ordinary bolt is threadably engaged into the machine treaded hole to hold the strap roller in place on the truck rub rail.

A strap rolling device similar to the foregoing devise is also available and comprises a strap roller having a first ordinary machine threaded nut to receive a male member projecting from a threaded first end of a crank roller base and a pair of projecting members welded to opposite sides of the nut projecting from the free end of a roller crank shaft. These projecting members are in parallel with the roller crank shaft and also serve as strap grips as described above. The roller crank shaft of this device is similar to that of the foregoing device. A connector shaft eyelet is welded to one end of a flat connector shaft to receive the free end of the roller crank shaft prior to its threaded engagement with the nut of the strap roller. An L-shaped metal bracket is welded to the other end of the flat connector shaft to engage the truck rub rail in the same manner as the strap rolling device described above. A second ordinary machine threaded nut is welded to the flat surface of the connector shaft adjacent to the other end of the connector shaft. An ordinary bolt, to which is welded a bar extending parallel to the connector shaft, is threaded into the second bolt. This bar assists in threadably engaging the bolt into the second nut to hold the strap roller in place on the truck rub rail.

Numerous other innovations for strap rollers are present in the prior art that are adapted to be used. Even though these innovations may be suitable for the specific individual purposes to which they address, they are not as suitable nor as efficient for the purposes of the present invention as heretofore described.

SUMMARY OF THE INVENTION

The present invention is a strap roller having a crank and a specifically designed holding means to attach to a truck rub rail or stake pocket. Throughout the specification and claims the phrase "rub rail" is used and is intended to include stake pockets or other means used on trucks to strap down cargo. For ease of portability, the strap roller of the present invention comprises a three piece construction and includes a more efficient holding means for easily and quickly attaching the strap roller to the truck rub rail. The device is primarily utilized to roll up a strap used to hold down cargo onto a truck bed. It is very important for truckers to be able to quickly mount the strap roller to the rub rail and to quickly tighten the rolling means to the rub rail by hand without damage to the rub rail.

The types of problems encountered in the prior art are truck cargo strap rolling means that are very cumbersome, require much more time to mount, and are more difficult to mount to the rub rail with sufficient torque to stay mounted.

In the prior art, unsuccessful attempts to solve this problem were attempted namely: strap rollers with inefficient strap rolling means. However, the problem was solved by the present invention by the specifically designed holding means that enable one to manually apply sufficient high torque and to quickly and efficiently attach the strap rollers to a truck rub rail in the matter of a second or two. The problem with prior art strap rollers using more cumbersome means for gripping the strap was solved with the present invention by the use of a single unitary grip base and C-type clamp connector using Acme threads as distinguished from ordinary machine threads. Another problem with prior art strap rollers is the end of the strap that is tucked under the lower layer of the rolled strap often becomes unrolled. This problem was solved by an embodiment of the present invention with the use of a specially designed strap clip means that easily fits over the end of the strap to prevent it from becoming unrolled.

The present invention went contrary to the teaching of the prior art which invention describes and claims a truck rub rail C-type clamp holding means for truck pull down straps.

The present invention solved a long felt need for a quick and easily attachable strap rolling device.

The present invention produced unexpected results namely:

Accordingly, the present invention provides a strap rolling device having a two piece roller and a unitary roller device connector that can be quickly manually attached to the rub rail with sufficient torsion with a flick of the wrist. The present invention also provides a two piece roller having a roller crank connected to a unitary roller head.

In keeping with these advantages over the prior art devices, and with others which will become apparent hereinafter, one feature of the present invention resides, briefly stated, in the roller crank having a roller crank shaft and a roller crank handle joined to a roller crank connecting C-type clamp.

When the unitary roller head is designed in accordance with the present invention, it has a roller head base, a roller head strap grip, a roller head strap connector.

Another feature of the present invention is that the roller device connector comprises a connector shaft, a connector holder first member, a connector holder second member, and a connector holder third member generally forming a "C", and a C-type connector clamp. The connector holder first member has an opening through which a threaded inset is insert and fixedly mounted. The C-type connector clamp has a connector clamp threaded member that is threadably engaged in the threaded inset, a connector clamp stopper, and a connector clamp horizontal member for easily applying sufficient manual torsion between the clamp stopper and the rub rail without damaging the rail.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWINGS

FIG. 1 is a top view of a strap rolling device.
FIG. 2 is a side view of a strap roller.
FIG. 3 is a side view of a connector.
FIG. 3A is a detailed view of one end of the connector.
FIG. 3B is a side view of an inset.
FIG. 4 is a side view of a strap clamp.
FIG. 5 is top view of a strap clamp.

LIST OF REFERENCE NUMERALS UTILIZED IN THE DRAWINGS

10—strap rolling device (10)
12—roller (12)
12A—roller crank (12A)
12AA—roller crank shaft (12AA)
12AAA—roller crank shaft male member (12AAA)
12AB—roller crank handle (12AB)
12AC—roller crank connector (12AC)
12B—roller head (12B)
12BA—roller head base (12BA)
12BAA—roller head base female member (12BAA)
12BB—roller head strap grip (12BB)
12BC—roller head strap connector (12BC)
12BD—roller head slot
14—connector (14)
14A—connector shaft (14A)
14AA—connector shaft eyelet (14AA)
14B—connector holder first member (14B)
14BA—connector holder first member opening (14BA)
14C—connector holder second member (14C)
14D—connector holder third member (14D)
14E—connector clamp (14E)
14EA—connector clamp threaded member (14EA)
14EB—connector clamp stopper (14EB)
14EC—connector clamp horizontal member (14EC)
14ED—connector clamp knob (14ED)
15—inset (15)
15A—inset Acme threaded opening (15A)
15B—inset first member (15B)
15C—inset second member (15C)
15D—inset knurled member (15D)
16—strap clip
16A—strap clip base member
16B—strap clip top member
16C—strap clip connecting member

DESCRIPTION OF THE PREFERRED EMBODIMENT

Now referring to FIG. 1 which is a top view of a strap rolling device (10) which comprises a roller (12) consisting of a roller crank (12A) and a roller head (12B) each positioned at opposite ends thereof. The strap rolling device (10) is manufactured from a high tensile strength material selected from a group consisting of metal, metal alloy and plastic composite and preferably, a heavy duty steel.

Referring to FIG. 2 which is a side view of a roller (12) which comprises a unitary roller head (12B) having a roller head base (12BA) mountable to the roller crank (12A). The roller crank (12A) preferably further comprises a roller crank shaft (12AA) securely connected at a distal end to the roller head base (12BA) and securely connected at an opposite distal end to a roller crank connector (12AC) positioned downwardly at an approximate perpendicular angle thereto. The roller crank (12A) further comprises a roller crank handle (12AB) securely connected to the roller crank connector (12AC) positioned outwardly at an approximate perpendicular angle thereto and positioned at an approximate parallel configuration to the roller crank shaft (12AA).

The roller head (12B) further comprises a roller head strap connector (12BC) securely connected to and extending outwardly at an approximate perpendicular angle from the roller head base (12BA). The roller head (12B) further comprises a roller head strap grip (12BB) extending from the roller head strap connector (12BC) at an approximate perpendicular angle in an approximate parallel configuration to the roller head base (12BA) forming a roller head slot (12BD) therebetween which functions to accept at least one end of a strap therein. The roller crank shaft (12AA) preferably comprises an indented free end and a threaded roller crank shaft male member (12AAA) extending from the free end. The roller head base (12BA) preferably further comprises a complimentary roller head base female member (12BAA) therein which functions to securely engage the roller crank shaft male member (12AAA) therein.

Referring to FIG. 3 is a side view of a connector (14) which comprises a connector shaft (14A) having a connector shaft eyelet (14AA) positioned at one distal end functioning to rotatably accept preferably the indented free end of the roller crank shaft (12AA) therein. The connector shaft (14A) further comprises a holding means positioned at an opposite distal end which functions to engage a truck rub rail.

The holding means preferably comprises the connector shaft (14A) securely connected at a rear distal end to a front of a connector holder first member (14B) which is securely connected at a rear distal end to a bottom distal end of a connector holder second member (14C) extending upwardly therefrom at an approximate perpendicular angle thereto. The connector holder second member (14C) is further connected at a top distal end to a connector holder third member (14D) extending frontwardly therefrom at an approximate perpendicular angle thereto. The connector holder first member (14B) further comprises a connector holder first member opening (14BA) into which an inset (15) is inserted. Inset (15) preferably has a knurled side wall and is operably fixed into position by machine pressing within opening (14BA). A connector clamp threaded member (14EA) of a connector clamp (14E) is positioned at an approximate perpendicular angle to connector holder first member (14B). The connector clamp threaded member (14EA) comprises a connector clamp horizontal member (14EC) securely connected at a bottom end and at an approximate perpendicular angle thereof to form a "C-type" clamp configuration between the connector shaft (14A) and the inset Acme threaded opening (15A). The connector clamp threaded member (14EA) and the connector clamp horizontal member (14EC) function to engage the truck rub rail therein. The connector shaft (14A) is at a downward obtuse angle from connector holder first member (14B), which functions to position the connector holding means (14) at a proper angle to the truck bed. The connector clamp (14E) further comprises a connector clamp stopper (14EB)

having a larger diameter than the inset Acme threaded opening (15A) rotatably positioned on the knob (14ED) on distal end of the connector clamp threaded member (14EA) functioning to prevent disengagement of the connector clamp (14E) from the connector first member (14B). The clamp stopper (14EB) is designed to adapt to all rub rails or stake pocket configurations, which are often manufactured from aluminum, without marring them.

In another embodiment of the present invention, means are provided to keep a cargo strap from unrolling after it is wound around the strap roller. FIGS. 4 and 5 show such means in the form of strap clip 16 which easily slips over a wound strap on roller 12. Strap clip 16 has base member 16A, upper member 16B and connecting member 16C.

It will be understood that each of the elements described above, or two or more together, may also find a useful application in other types of constructions differing from the type described above.

EXAMPLE

Functional prototypes of the strap roller of the present invention, illustrated in FIGS. 1, 2, 3, 3A, and 3B, were constructed of heavy duty steel. The connector shaft (14A) was a flat shaft ⅜" in thickness and 19.25" long having a first bend forming connector holder first member (14B), as shown in FIG. 3, 10.25" from the first end which was welded to shaft eyelet (14AA). Eyelet (14AA) was a tube 1.75" long and having an OD of 0.75" and an ID of 0.5" to rotatably accept 1.75" long indented section shown in FIG. 2, having a diameter of slightly less than 0.5", of the roller crank shaft (12AA). Connector holder first member opening (14BA), having a diameter of approximately 0.885" was drilled 0.875" from the first bend. Three inches from the first bend, a right angle bend formed connector holder second member (14C) and another right angle bend formed connector holder third member (14D) resulting in the "C" of the clamp of this invention. A 0.875" thick inset (15) having as the diameter of 0.885" of first inset member (15B) was welded (not shown) to the walls of opening (14BA) in first member (14B) so that inset second member (15C) having a diameter of 1" was positioned as shown in FIG. 3A. A 9/16" diameter opening (15A) in the inset (15) was threaded with Acme threads and was sufficient to accommodate approximately 5 to 6 threads of connector clamp threaded member (14EA).

In another prototype, the inset (15) was manufactured with knurled side wall (15D), which was machined pressed within the connector holder first member opening (14BA) having a diameter of approximately 0.885". This resulted in a much more polished appearance than the prototype with the welds. All of the other features of the prototype described above were the same as this prototype with the inset (15) having the knurled side wall (15D).

Connector clamp threaded member (14EA) had a diameter of 9/16" and a length of approximately 6" from one end having a slot to accommodate connector clamp horizontal member (14EC) to the other end, which length included connector clamp stopper (14EB) mounted at the other end of threaded member (14EA). In the preferred prototype embodiment, only approximately 2¼" of the length of connector clamp (14E) closest to clamp stopper (14EB) were treaded with 14 Acme threads. Clamp stopper (14EB) was rotably mounted on the knob (14ED) at the distal end of the threaded member (14EA) to provide mounting flexibility. The horizontal member or pin handle (14EC) to apply torque to connector clamp (14E) was a rod 5/16" in diameter 3½" having a stop 0.335" in diameter at each end shown in FIG. 3A.

Roller crank handle (12AB) of roller crank (12A) was formed from ⅝" round stock of roller (12) approximately 8¼" in length. Roller crank handle (12AB) was 4" in length. Roller crank connector (12AC) was 4½" in length. Roller crank shaft (12AA) was approximately ¾" and had threaded roller crank shaft male member (12AAA) extending therefrom. Threaded roller crank shaft male member (12AAA) was approximately ½" in length and approximately 5/16" diameter to engage complimentary roller head base female member (12BAA) in roller head base (12BA) of roller head (12B). Base (12BA) was made from the same round stock as roller crank (12A). In the prototype roller head strap grip (12BB) was bent 1½" from one end of grip (12BB) to form roller head strap connector (12BC) which was welded to the end of base (12BA) adjacent female member (12BAA) and extending from base (12BA) as shown in FIG. 2. All of the exposed surfaces of strap roller (10) were coated with a powder coating for a long lasting and durable finish. The prototypes were coated with powder coatings of a number of distinctive colors.

Cargo clip (16) was constructed of stainless steel having a width of 13/16" with base member (16A) 3⅞" long, upper member (16B) 3¾" long and connecting member (16C) 1⅛" in length. A bend was made in upper member (16B) approximately 2¾" form connecting member (16C) to form a strap grabbing throat ((12BD) of approximately ½" at its narrowest and approximately ¾" at its widest.

The strap roller comes in three pieces: connector (14), roller crank (12A) and roller head (12B) which pieces are easily assembled by placing the indented section of roller crank (12A) through eyelet (14AA) of connector 14 and threading and tightening female member (12BAA) onto male member (12AAA). After assembly, the prototype of this example was placed over an aluminum rub rail or stake pocket of a truck. No more than 2 seconds was required to rotate pin handle (14EC) with a flick of the wrist so that adequate torsion was applied to the rub rail to maintain the roller in position for use in holding a truck cargo strap until it was used. In addition, the clamp stopper (14EB) enabled the user to more quickly adapt to the rub rail and to do so without any damage to the rub rail. One end of the strap having a width of approximately ⅛" was inserted in roller head slot (12BD) and the handle was rotated to cause the strap to wind around the outer surface of roller head base (12BA) and roller head strap grip (12BB). After the cargo strap was rolled around base (12BA) and grip (12BB), base member (16A) of strap clip (16) was easily slipped between the eight and ninth layers of strap with upper member (16B) over the top of the strap with connecting member (16C) flush against the side of the rolled up strap.

In contrast to the prototype described above, each of the two prior art roller devices described under the Description of the Prior Art section required over 12 seconds so that adequate torsion was applied to the rub rail to maintain the roller in position for use in holding a truck cargo strap. After the this length of time, the machine bolt did not make complete contact with the rub rail and the contract it did make left an marked impression after it was removed.

While the embodiments of the present invention have been illustrated and described as embodied in a strap roller and a clip, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A strap rolling device (10) comprising:

(a) a roller (12) which comprises a roller crank (12A) and a roller head (12B) each positioned at opposite ends thereof, the roller head (12B) comprises a roller head base (12BA) securely connected to the roller crank (12A), the roller head (12B) further comprises a roller head strap connector (12BC) extending outwardly at an approximate perpendicular angle from the roller head base (12BA), the roller head (12B) further comprises a roller head strap grip (12BB) securely connected to and extending from the roller head strap connector (12BC) at an approximate perpendicular angle in an approximate parallel configuration to the roller head base (12BA) forming a roller head slot (12BD) therebetween which functions to accept at least one end of a strap therein;

(b) a connector (14) which comprises a connector shaft (14A) having a connector shaft eyelet (14AA) positioned at one distal end functioning to rotatably accept the roller crank (12A) therein;

(c) a C-type clamp holding means positioned at an opposite distal end of the connector shaft (14A) which functions to engage a truck rub rail, said holding means comprising the connector shaft (14A) securely connected at a rear distal end to a front of a connector holder first member (14B), which shaft (14A) extends at a downward obtuse angle from said first member (14B) and is securely connected at a rear distal end to a top distal end of a connector holder second member (14C) extending therefrom at an approximate perpendicular angle thereto, the connector holder second member (14C) is further connected at a top distal end to a connector holder third member (14D) extending downwardly therefrom at an approximate perpendicular angle thereto;

(d) an inset (15) inserted and operably joined within an opening (14BA) in the connector holder first member (14B), said inset (15) having an Acme threaded opening (15A) through which a connector clamp threaded member (14EA) of a connector clamp (14E) is positioned at an approximate perpendicular angle thereto, said connector clamp threaded member (14EA) comprising a connector clamp member (14EC) securely connected at a bottom end at an approximate perpendicular angle thereof forming a "C-type" configuration between the connector shaft (14A) and the inset Acme threaded opening (15A), and said connector clamp threaded member (14EA) and the connector clamp member (14EC) functioning to engage the truck rub rail therein; and (e) a connector clamp stopper (14EB) having a larger diameter than the inset Acme threaded opening (15A) rotatably positioned at a distal end of the connector clamp threaded member (14EA) functioning to prevent damage to the truck rub rail and disengagement of the connector clamp (14E) from the connector first member (14B).

2. The strap rolling device (10) as described in claim 1, wherein the roller crank (12A) further comprises a roller crank shaft (12AA) securely connected at a distal end to the roller head base (12BA) and securely connected at an opposite distal end to a roller crank connector (12AC) positioned downwardly at an approximate perpendicular angle thereto, the roller crank (12A) further comprises a roller crank handle (12AB) securely connected to the roller crank connector (12AC) positioned outwardly at an approximate perpendicular angle thereto and positioned at an approximate parallel configuration to the roller crank shaft (12AA).

3. The strap rolling device (10) as described in claim 1, wherein the roller crank shaft (12AA) comprises a roller crank shaft male member (12AAA) extending therefrom, the roller head base (12BA) further comprises a complimentary roller head base female member (12BAA) therein which functions to securely engage the roller crank shaft male member (12AAA) therein.

4. The strap rolling device (10) as described in claim 1, wherein the connector shaft (14A) is connected to at a downward obtuse angle from the connector first member opening (14BA), which angle functions to position the holding means away from a cargo placed on a truck bed.

5. The strap rolling device (10) as described in claim 1 is manufactured from a high tensile strength material selected from a group consisting of metal, metal alloy, and plastic composite.

6. The strap rolling device (10) as described in claim 1, wherein strap clip means (16) are provided for maintaining a cargo strap from unrolling after it is wound around said roller head (12B).

* * * * *